(12) United States Patent
Wang et al.

(10) Patent No.: US 11,108,796 B1
(45) Date of Patent: *Aug. 31, 2021

(54) SYSTEM AND METHOD FOR IDENTIFYING SECURITY ENTITIES IN A COMPUTING ENVIRONMENT

(71) Applicant: Awake Security, Inc., Sunnyvale, CA (US)

(72) Inventors: Daniel Wang, Redwood City, CA (US); Debabrata Dash, San Jose, CA (US); Gary Golomb, Los Gatos, CA (US)

(73) Assignee: AWAKE SECURITY LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,609

(22) Filed: Nov. 26, 2018

Related U.S. Application Data

(63) Continuation-in-part of application No. 15/136,865, filed on Apr. 22, 2016, now Pat. No. 10,142,359.

(51) Int. Cl.
*H04L 29/06* (2006.01)

(52) U.S. Cl.
CPC ........ *H04L 63/1425* (2013.01); *H04L 63/168* (2013.01)

(58) Field of Classification Search
CPC ............ H04L 63/1425; H04L 63/1416; H04L 63/1408; H04L 63/14; H04L 63/126; H04L 63/12; H04L 63/168
See application file for complete search history.

(56) References Cited

U.S. PATENT DOCUMENTS

| | | | | |
|---|---|---|---|---|
| 9,485,262 | B1 * | 11/2016 | Kahn | H04L 63/0227 |
| 2006/0294562 | A1 * | 12/2006 | Kikkoji | H04H 40/18 725/105 |
| 2008/0114806 | A1 * | 5/2008 | Kosche | G06F 11/3495 |
| 2008/0132215 | A1 * | 6/2008 | Soderstrom | H04L 67/14 455/416 |
| 2008/0209552 | A1 * | 8/2008 | Williams | G06F 21/31 726/22 |

* cited by examiner

*Primary Examiner* — Ayoub Alata
(74) *Attorney, Agent, or Firm* — Fountainhead Law Group P.C.

(57) ABSTRACT

System and method to identify a security entity in a computing environment is disclosed. Communication between a user computer and at least one destination computer by a security appliance is monitored by a security appliance. A virtual identifier is assigned to a subset of the communication within a defined time period. At least one security entity is identified based on a subset of the selective information. The assigned virtual identifier associated with at least one security entity.

22 Claims, 16 Drawing Sheets

| Decisive Identifiers | Security Entity |
|---|---|
| Kerberos ID | User |
| pac Email | User |
| Personal Email | User |
| userid | User |
| ApplePushGUID | Device |
| Kerberos Device | Device |
| Cookies | Device + Browser |

FIGURE 4

| Attributes |
|---|
| event_ssl |
| os |
| os_version |
| browser |
| compile_version |

FIGURE 4A

| Decisive Identifiers | Protocol | Required Fields |
|---|---|---|
| Kerberos ID | kerberos | client, success |
| pac Email | http | uri |
| Personal Email | http | uri |
| userid | http | uri |
| ApplePushGUID | ssl | client_subject |
| Kerberos Device | kerberos | client |
| Cookies | http | uri |

FIGURE 4B

| Time Stamp | Source ID | Client | Status |
|---|---|---|---|
| 1428494181 | 1.1.1.1 | ABC-11111$/GEO.DOMAIN.COM | Success |
| 1428494181 | 1.1.1.1 | john.doe/GEO.DOMAIN.COM | Success |
| 1428494332 | 1.1.1.1 | ABC-11111$/GEO.DOMAIN.COM | Success |
| 1428497128 | 1.1.1.1 | ABC-22222$/GEO.DOMAIN.COM | Success |
| 1428497128 | 1.1.1.1 | jane.smith/GEO.DOMAIN.COM | Success |

FIGURE 5

| Time Stamp 602 | Source ID 604 | Decisive Identifier 606 | Comments 608 |
|---|---|---|---|
| 1428494181.223 | 1.1.1.1 | Kerberos: A | Associate *Kerberos:A* to ID 1.1.1.1 in the interval [1428494181-1428494182] |
| 1428494183.188 | 1.1.1.1 | ' | http session |
| 1428494184.889 | 1.1.1.1 | ' | sip session |
| 1428494198.226 | 1.1.1.1 | Personal Email: M | Associate *Personal Email: M* to ID 1.1.1.1 in the interval [1428494198-1428494199] |
| 1428494261.781 | 1.1.1.1 | Kerberos: A | Associate *Kerberos:A* to ID 1.1.1.1 in the interval [1428494262-1428494263]  Extend *Kerberos:A* to ID 1.1.1.1 in the interval [1428494182-1428494263] |
| 1428494322.689 | 1.1.1.1 | ' | ftp session |
| 1428494543.299 | 1.1.1.1 | Personal Email: M | Associate *Personal Email:M* to ID 1.1.1.1 in the interval [1428494543-1428494544]  Extend *Personal Email:M* to ID 1.1.1.1 in the interval [1428494199-1428494544] |
| 1428494666.121 | 1.1.1.1 | ' | http session |

FIGURE 6A

| Time Stamp | Source ID | Decisive Identifier | Comments |
|---|---|---|---|
| 1428494798.222 | 1.1.1.1 | - | sip session |
| 1428494798.223 – 1428496871.900 | 1.1.1.1 | - | No activity |
| 1428496871.901 | 1.1.1.1 | Kerberos: A | Associate Kerberos:A to ID 1.1.1.1 in the interval [1428496871-1428496872]<br>Extend Kerberos:A to ID 1.1.1.1 in the interval [1428494263-1428494799] |
| 1428496922.561 | 1.1.1.1 | - | http session |
| 1428496972.222 | 1.1.1.1 | - | sip session |
| 1428496972.223 – 1428497128.571 | 1.1.1.1 | - | No activity |
| 1428497128.572 | 1.1.1.1 | Kerberos: B | Associate Kerberos:B to ID 1.1.1.1 in the interval [1428497128-1428497129]<br>Extend Kerberos:A to ID 1.1.1.1 in the interval [1428496872-1428496973] |

FIGURE 6B

| Time Stamp | Source ID | First Security Entity | Second Security Entity | First Decisive Identifier | Second Decisive Identifier |
|---|---|---|---|---|---|
| T1 | 1.1.1.1 | First User Computer | First User | Kerberos:A | |
| T2 | 1.1.1.1 | First User Computer | First User | | Personal Email:M |
| T3 | 1.1.1.1 | First User Computer | First User | Kerberos:A | |
| T4 | 1.1.1.1 | First User Computer | First User | | Personal Email:M |
| T5 | 1.1.1.1 | No activity | | | |
| T6 | 1.1.1.1 | First User Computer | First User | Kerberos:A | |
| T7 | 1.1.1.1 | No Activity | | | |
| T8 | 1.1.1.1 | Second User Computer | Second User | Kerberos:B | |

FIGURE 7A

| Time stamp | Source ID | First Security Entity | Second Security Entity | First Decisive Identifier | Second Decisive Identifier |
|---|---|---|---|---|---|
| T1-T5 | 1.1.1.1 | First User Computer | First User | Kerberos:A | |
| T2-T4 | 1.1.1.1 | First User Computer | First User | | Personal Email: M |
| T5-T6 | 1.1.1.1 | No activity | | | |
| T6-T7 | 1.1.1.1 | First User Computer | First User | Kerberos:A | |
| T7-T8 | 1.1.1.1 | No activity | | | |
| T8-T9 | 1.1.1.1 | Second User Computer | Second User | Kerberos:B | |

FIGURE 7B

| Time Stamp | Source ID | Decisive Identifier | Virtual Identifier | Comments |
|---|---|---|---|---|
| 1428494178.112 | 1.1.1.1 | - | VID1 | http session<br>Associate VID1 to ID 1.1.1.1 in the interval [1428494178-1428494179] |
| 1428494180.211 | 1.1.1.1 | - | VID1 | ftp session<br>Extend VID1 interval [1428494178-1428494181] |
| 1428494181.223 | 1.1.1.1 | Kerberos: A | VID1 | Extend VID1 interval to [1428494178-1428494182]<br>Associate Kerberos:A to VID1<br>Create Entity ID EID1 and associate with VID1 |
| 1428494183.188 | 1.1.1.1 | - | VID1 | http session<br>Extend VID1 interval [1428494178-1428494184] |
| 1428494184.889 | 1.1.1.1 | - | VID1 | sip session<br>Extend VID1 interval [1428494178-1428494185] |
| 1428494199.226 | 1.1.1.1 | Personal Email: M | VID2 | Associate Personal Email: M to VID2 in the interval [1428494199-1428494200] |
| 1428494205.781 | 1.1.1.1 | Kerberos: A | VID2 | Associate Kerberos:A to VID2 Extend VID2 interval [1428494199-1428494206]<br>Associate VID1 and VID2 with Entity ID EID1 |
| 1428494219.781 | 1.1.1.2 | Kerberos: B | VID3 | Kerberos<br>Associate Kerberos:B to VID3 interval [1428494219-1428494210]<br>Create Entity ID 2 and Associate with VID3<br>Associate Kerberos:B to Entity ID EID2 |
| 1428494224.781 | 1.1.1.2 | - | VID3 | http session<br>Extend VID3 interval [1428494219-1428494224] |

FIGURE 8A

| Activity ID | Time Stamp | Source ID | Virtual Identifier | Kerberos | Personal Email | Protocol |
|---|---|---|---|---|---|---|
| AID1 | 1428494178.112 | 1.1.1.1 | VID1 | | | http |
| AID2 | 1428494180.211 | 1.1.1.1 | VID1 | | | ftp |
| AID3 | 1428494181.223 | 1.1.1.1 | VID1 | A | | Kerberos |
| AID4 | 1428494183.186 | 1.1.1.1 | VID1 | | | http |
| AID5 | 1428494184.889 | 1.1.1.1 | VID1 | | | sip |
| AID6 | 1428494199.226 | 1.1.1.1 | VID2 | | M | http |
| AID7 | 1428494205.781 | 1.1.1.1 | VID2 | A | | Kerberos |
| AID8 | 1428494219.781 | 1.1.1.2 | VID3 | B | | Kerberos |
| AID9 | 1428494224.781 | 1.1.1.2 | VID3 | | | http |

FIGURE 9

| Time Stamp Interval | Source ID | Virtual Identifier | Entity ID |
|---|---|---|---|
| 1428494178-1428494185 | 1.1.1.1 | VID1 | EID1 |
| 1428494199-1428494206 | 1.1.1.1 | VID2 | EID1 |
| 14284219-14284224 | 1.1.1.2 | VID3 | EID2 |

FIGURE 10

| ENTITY ID | Kerberos | Personal Email |
|---|---|---|
| EID1 | A | M |
| EID2 | B | |

FIGURE 11

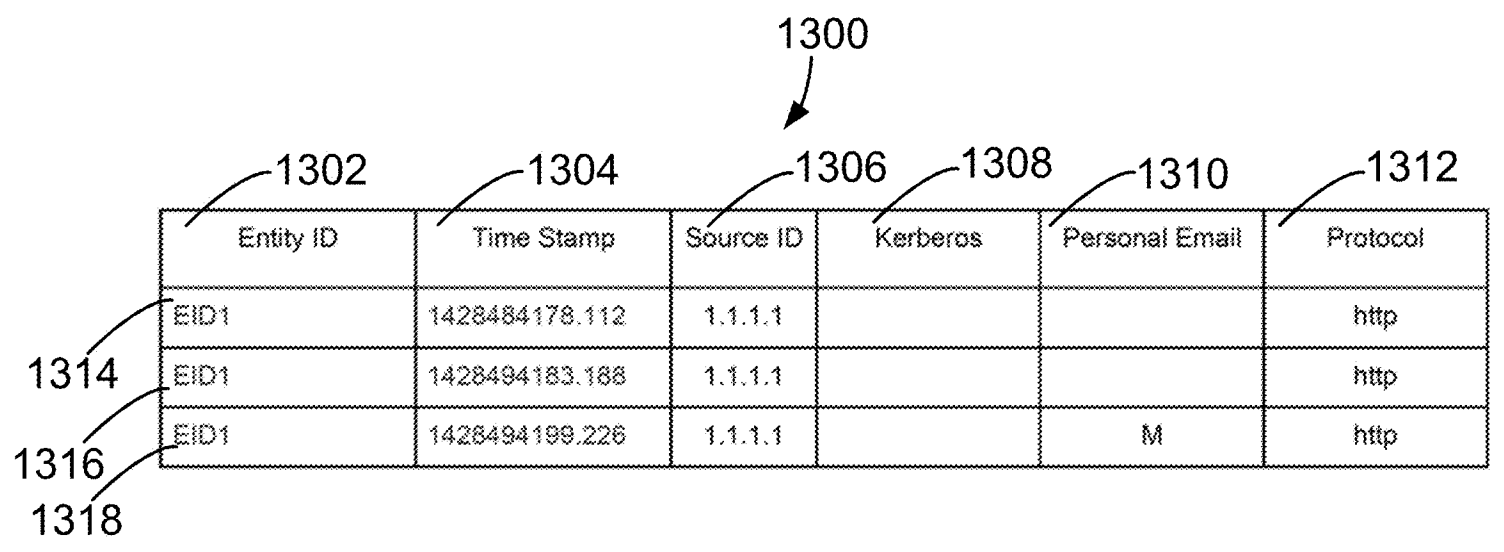

| Entity ID | Time Stamp | Source ID | Kerberos | Personal Email | Protocol |
|---|---|---|---|---|---|
| EID1 | 1428484178.112 | 1.1.1.1 | | | http |
| EID1 | 1428494183.188 | 1.1.1.1 | | | http |
| EID1 | 1428494199.226 | 1.1.1.1 | | M | http |

FIGURE 13

SYSTEM AND METHOD FOR IDENTIFYING SECURITY ENTITIES IN A COMPUTING ENVIRONMENT

RELATED APPLICATIONS

This application is a continuation-in-part application of and claims priority to U.S. patent application Ser. No. 15/136,865 filed on Apr. 22, 2016, entitled "SYSTEM AND METHOD FOR IDENTIFYING SECURITY ENTITIES IN A COMPUTING ENVIRONMENT". Patent application Ser. No. 15/136,865 is incorporated herein by reference, in its entirety.

TECHNICAL FIELD

The present invention relates generally to identifying security entities in a computing environment and, more particularly, identifying security entities based on network communication in the computing environment.

DESCRIPTION OF RELATED ART

In the present day computing environment, an enterprise has to deal with monitoring and tracking enormous amount of activities occurring between various computing devices. Computing environment may include various security entities. A security entity may be a person, an application or a computing device whose behavior needs to be understood by a network administrator to maintain integrity of the network environment. In some examples, identifying a security entity and associating a security entity with other security entities may be required to maintain integrity of the network environment.

In order to conduct a focused analysis of one or more security entities, there is a need to identify a security entity and associate a security entity with other security entities. As the number of security entities and number of transactions over a computing environment increases, selectively identifying one or more security entities becomes challenging. In some examples, characterizing a security entity may be advantageous in maintaining integrity of the network environment. It is with these needs in mind, this disclosure arises.

SUMMARY OF THE INVENTION

In one embodiment, a method for identifying a security entity in a computing environment is disclosed. Communication between a user computer and at least one destination computer is monitored by a security appliance. Selective information from the communication is extracted by the security appliance. A virtual identifier is assigned to a subset of the communication within a defined period. At least one security entity is identified based on a subset of the selective information. The assigned virtual identifier is associated with at least one security entity.

In yet another embodiment, a system to identify a security entity in a computing environment is disclosed. Communication between a user computer and at least one destination computer is monitored by a security appliance. Selective information from the communication is extracted by the security appliance. A virtual identifier is assigned to a subset of the communication within a defined period. At least one security entity is identified based on a subset of the selective information. The assigned virtual identifier is associated with at least one security entity.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures:

FIG. 4 shows an example table with a plurality of decisive identifiers and corresponding security entities the decisive identifiers identify;

FIG. 4A shows an example table with a plurality of attributes associated with one or more security entities;

FIG. 4B shows an example table with various decisive identifiers, corresponding protocol of the network packet and one or more fields of the network packet required to identify the corresponding decisive identifier;

FIG. 5 shows a table with various time stamps with decisive identifiers associated with source identifiers;

FIGS. 6A and 6B show table with various time stamp and corresponding decisive identifiers;

FIG. 7A shows an example knowledge graph according to an example implementation of this disclosure;

FIG. 7B shows an enhanced knowledge graph, according to an example implementation of this disclosure;

FIG. 8A shows a table with various time stamp and corresponding virtual identifiers;

FIG. 9 shows an example table with various activities and corresponding attributes;

FIG. 10 shows an example table with virtual identifiers with corresponding entity identifiers;

FIG. 11 shows an example table with entity identifiers and corresponding decisive identifiers;

FIG. 13 shows an example table with results of an association between a selected security entity with a corresponding selected attribute;

DETAILED DESCRIPTION

Figure 1:
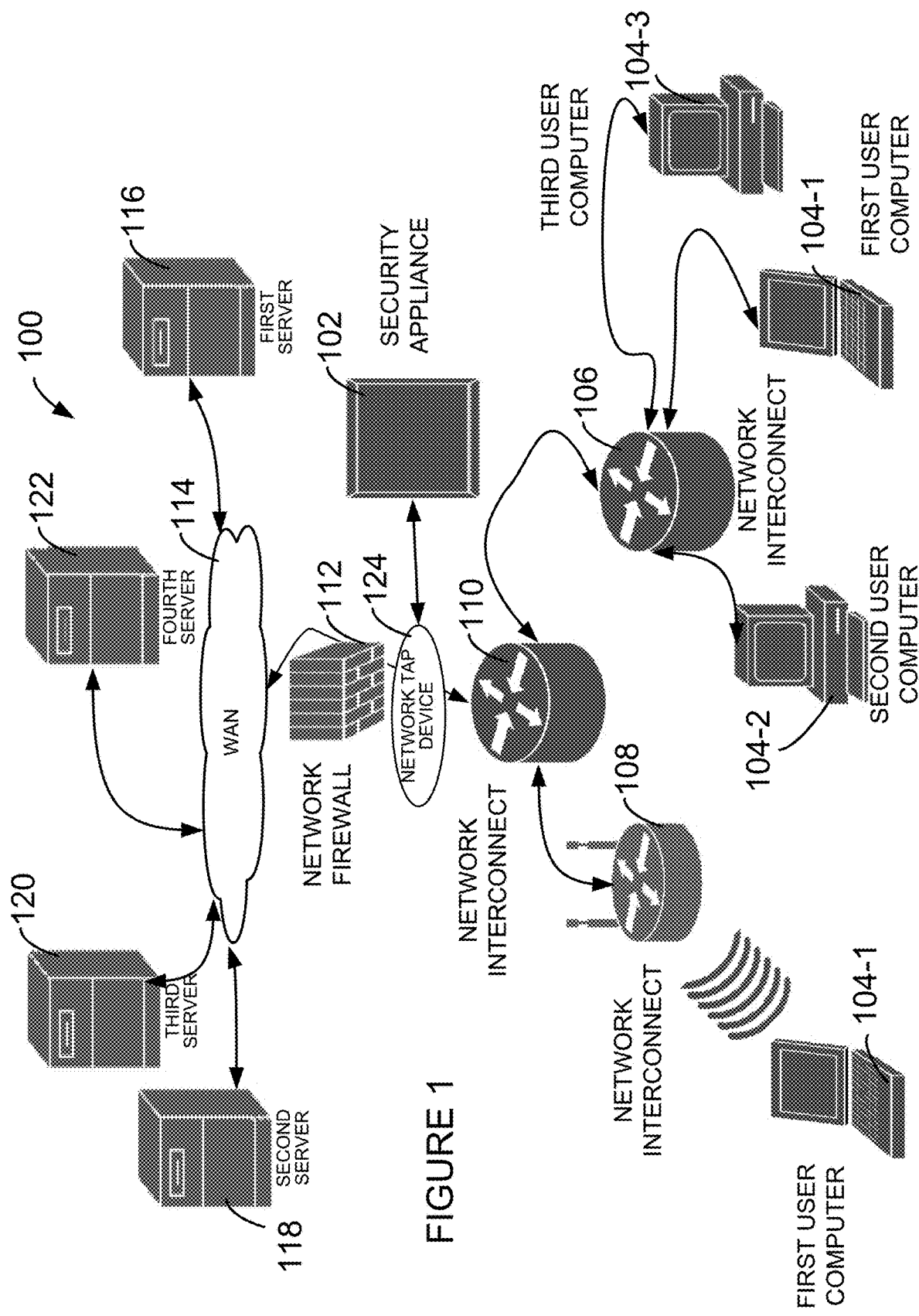
FIG. 1 shows an example computing environment with example security appliance of this disclosure, according an example of this disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a systems and methods for evaluating security entities in a computing environment. Referring now to the drawings, where similar reference characters denote corresponding features consistently throughout the figures, various examples of this disclosure is described.

FIG. 1 depicts an example computing environment 100, with a security appliance 102 of this disclosure. The computing environment 100 includes a plurality of user computers, for example, a first user computer 104-1, a second user computer 104-2 and a third user computer 104-3. The computing environment also includes a plurality of network interconnect devices 106, 108 and 110. In some examples, network interconnect device 106 may couple first user computer 104-1, second user computer 104-2 and third user computer 104-3 to form a local area network, for example, an office network. The network interconnect device 108 may be a wireless router, for example, in a conference room, that may couple one or more user computers to form another network, for example, conference room wireless network. For example, the first user computer 104-1 may also selectively couple to the network interconnect device 108, when the first user computer 104-1 is in the conference room.

The network interconnect device 110 may be configured to couple to a network firewall device 112, which may couple the network interconnect device 110 to a wide area network 114. The network interconnect device 106 and 108 may couple to network interconnect device 110 to access the wide area network 114. A plurality of servers, for example, a first server 116, a second server 118, a third server 120 and a fourth server 122 may be coupled to the wide area network 114. The plurality of servers may be accessible to the first user computer 104-1, second user computer 104-2 and the third user computer 104-3 through the network interconnect device 110.

In one example, a network tap device 124 may be disposed between the network interconnect device 110 and the firewall device 112. The network tap device 124 may be configured to intercept and forward any communication between a user computer and a server, over the wide area network 110 to the security appliance 102. Various functions and features of the security appliance 102 will now be described with reference to FIG. 2.

Figure 2:
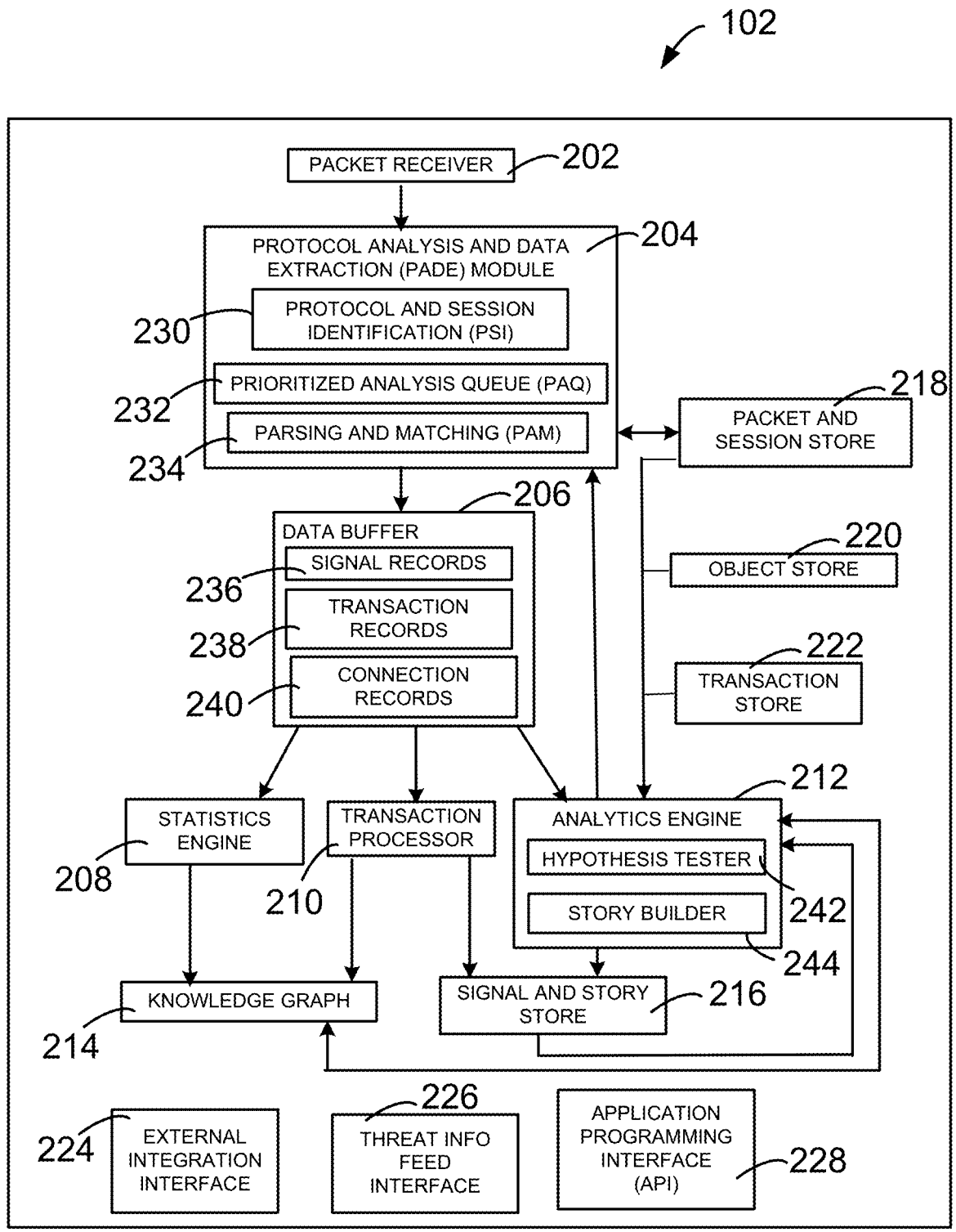
FIG. 2 depicts block diagram of an example security appliance of this disclosure.

Now, referring to FIG. 2, example security appliance 102 of this disclosure will be described. The security appliance 102 includes a packet receiver 202, a protocol analysis and data extraction module 204 (sometimes referred to as PADE module 204), a data buffer 206, a statistics engine 208, a transaction processor 210, an analytics engine 212, a knowledge graph 214, a signal and story store 216, a packet and session store 218, an object store 220 and a transaction store 222. The security appliance may additionally have an external integration interface 224, a threat info feed interface 226 and an application programming interface (API) 228. Various function and features of the security appliance 102 will now be described. Detailed operation of the security appliance 102 will be later described with reference to additional examples and figures.

The packet receiver 202 is configured to receive information from the network tap device 124. For example, packet receiver 202 may receive information related to network communication between a user computer and one or more servers, from the network tap device 124 in real time. Information related to network information may be one or more packets of information transmitted and received by the user computer. In some examples, the packet receiver 202 may be configured to receive information related to network communication between a user computer and one or more servers that might have been captured by a capture device (not shown) and stored in a data store (not shown). The information related to network communication between a user computer and one or more servers may sometimes be referred to as packets or packet of information in this disclosure. As one skilled in the art appreciates, the packet of information may contain information encapsulated in multiple layers. Analysis and extraction of information from each layer may lead to information in subsequent layers.

The PADE module 204 includes a protocol and session identification module 230 (sometimes referred to as PSI module 230), prioritized analysis queue 232 (sometimes referred to as PAQ module 232) and parsing and matching module 234 (sometimes referred to as PAM module 234). The PADE module 204 is configured to receive packet of information. The PADE module 204 queues the received packet to be stored in the packet and session store 218. Further, the PADE module 204 queues the received packet with an initial priority for further analysis by the PAQ module 232. The PAM module 234 analyzes the received packet by parsing protocol information from the packet content for each protocol encapsulated in the packet, and matches that data with feature patterns of interest, for example, security or network visibility. Processing of the packets by the PADE module 204 is an iterative process, where one level of encapsulation is processed to determine and discover information in that protocol and the protocol of the next encapsulation.

In one example, the prioritization used for analysis of the packet is based on a probability that the packet may be associated with a threat. This prioritization may be periodically updated, as the analysis of the packet proceeds. In some situations, there may be insufficient resources available at the packet and session store 218 to store all packets that are queued for storage. In one example, the selection of packet information to write (or store) to the packet and session store 218 may be based on a value of threat probability. In some examples, the selection of packet information to store may be based on a value of threat probability at the time selection is made, rather than when the packet was queued for storage. In other words, the queue to store the packet information is prioritized based on a value of threat probability.

Once a packet has been selected for storage, raw data of the packet may be written into the packet and session store 218 in a compressed form. The packet and session store 218 may also have indexing data for the packets to facilitate retrieval of the packets based on one or more attributes. For example, the attributes for indexing may be one or more of packet timestamp, network addresses, protocol and the like. Connection information extracted and generated by the PADE module 204 from one or more packets may contain references to corresponding sessions in the packet and session store 218. In one example, connection information may be stored in the knowledge graph 214, after further processing. Connection information may correspond to a plurality of attributes like user computer, details about user of the user computer, host server, organization of the user of the user computer and the like.

The PADE module 204 based on the analysis of the packets, identifies signal records, which may sometimes be referred to as weak signals indicative of a threat, transaction records and connection records. The identified signal records 236, transaction records 238 and the connection records 240 are stored in the data buffer 206 for further processing.

The statistics engine 208 processes the connection records 240 stored in the data buffer 206 and profiles the connection information from the connection records. Connection information may be stored in the knowledge graph 214, after further processing by the statistics engine 208. Connection information may correspond to a plurality of attributes like user computer, details about user of the user computer, host server, organization of the user of the user computer and the like.

The transaction processor 210 processes the transaction records 238 and extracts transaction information from the transaction records. Extracted transaction information by the transaction processor 210 is stored in the knowledge graph 214. Selective extracted transaction information is also stored in the signal and story store 216.

The analytics engine 212 processes the signal records 236. As previously indicated, signal records 236 may indicate weak signals of an impending threat. The analytics engine 212 analyzes the signal records 236 and develops a possible story of a likely threat. The story may be a sequence of signals about user computer, activity being performed and the like. The hypothesis tester 242 evaluates one or more weak signals for a likely threat. For example, one or more threshold values may be used to evaluate a likely threat. The story builder 244 builds a possible scenario for a likely threat, based on analyzed signal records. Selective generated story and corresponding signal records may be stored in the signal and story store 216.

As one skilled in the art appreciates, the information previously stored in the signal and story store 216 may be used by the analytics engine 212 during evaluation of subsequent signal records to further update or modify a possible scenario for a likely threat. Additionally, the analytics engine 212 may use information stored in the knowledge graph 214 during evaluation of signal records and building of a story for a likely threat. The story builder 244 also uses the analyzed signal records to generate information to update priority of analysis of incoming packets by the PADE module 204.

As one skilled in the art appreciates, the data buffer 206 may store information related to signal records 236, transaction records 238 and connection records 240 on a temporary basis. One or more additional data stores may be provided to store these information for an extended period of time, for possible future use. Object store 220 is a data store to store information related to various objects. For example, in some examples, objects may be files exchanged between a user computer and destination computer. Transaction store 222 stores information related to transaction, for example, for an extended period of time.

External integration interface 224 may provide an interface to communicate with other appliances, for example, other security appliances. Threat info feed interface 226 may provide an interface to communicate with external threat information feeds. These external threat information feed may be used by the security appliance 102 during various stages on analysis and story building. Application programming interface 228 may provide interface to one or more applications. For example, application programming interface 228 may provide an interface to an user interface application to permit a user to interact with the security appliance 102.

Figure 3:
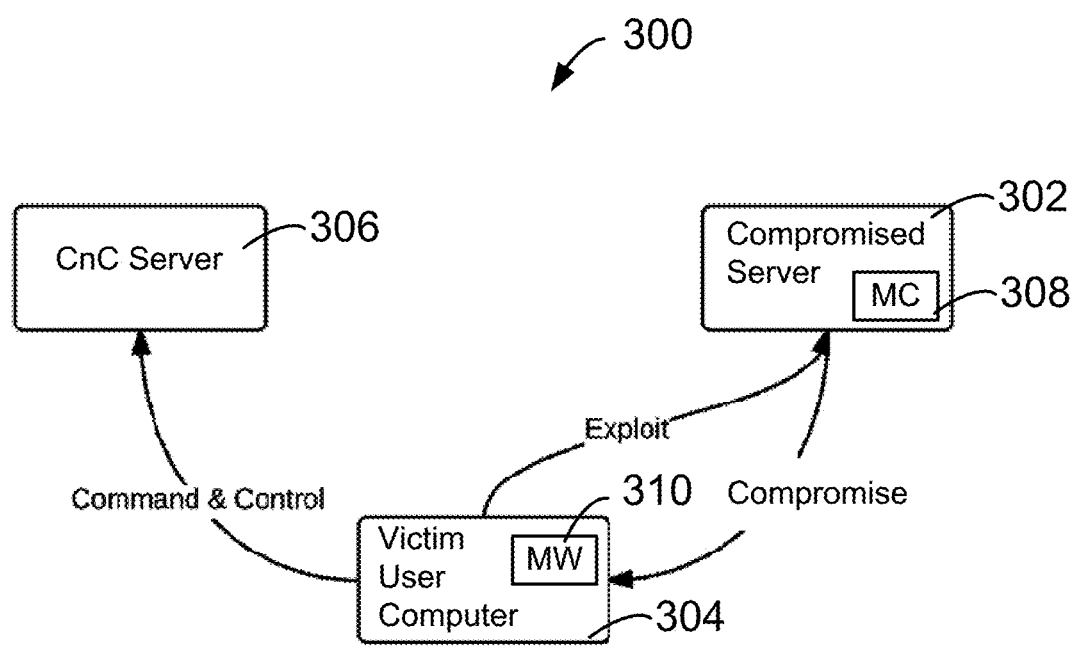
FIG. 3 shows various phases of an example malicious attack in an example computing environment.

Having described an example security appliance 102 of this disclosure, now referring to FIG. 3, flow diagram 300 shows various phases of an example malicious attack. FIG. 3 shows a compromised server 302, a victim user computer 304 and a command and control server 306 (sometimes referred to as a CnC server 306). In some examples, the victim user computer 304 may correspond to one of the first user computer 104-1, second user computer 104-2 and third user computer 104-3 described with reference to FIG. 1. In some examples, the compromised server 302 may correspond to first server 116 described with reference to FIG. 1. In some examples, the CnC server 306 may correspond to one or more of the second server 118, third server 120 and fourth server 122 described with reference to FIG. 1.

In general, a hacker compromises an external website running on a server the victim user computer 304 visits regularly, and injects malicious content 308 (sometimes referred to as malicious code 308) into the website. For example, the malicious content 308 may be present on the compromised server 302. When a user from the victim user computer 304 visits the website on the compromised server 302, the malicious code 308 may be executed. In some examples, the malicious code 308 may be an executable JavaScript. This phase may sometimes referred to as an exploit phase. In some examples, the malicious code 308 may load a malware 310 on to the victim user computer 304.

The malware 310 loaded on to the victim user computer 304 may be an executable code. This phase may sometimes be referred to as a compromise phase. The malware executable code may then connect to the CnC server 306 and waits for commands from the CnC server 306 to be executed on the victim user computer 304. This phase may sometimes referred to as command and control phase.

Having described various phases of likely malicious attack and general operation of the security appliance 102, an example evaluation of various security entities in a computing environment will now be described. The security entities in one example, may be computing devices in the computing environment, for example, first user computer 104-1, second user computer 104-2, third user computer 104-3, first server 116, second server 118, third server 120, and fourth server 122. In some examples, the security entity may be the first user, second user and the third user. In some examples, it may be accounts used by the first user, second user and the third user. In some examples, the security entity may be an application executed on a computing device. For example, a mail application, a web browser application and the like. In some examples, the security entity may be a group of users belonging to a specific group or an organization.

Now, referring to FIG. 4, table 400 shows a plurality of decisive identifiers and corresponding security entities the decisive identifiers identify. Referring to table 400, column 402 shows decisive identifiers and column 404 shows security entities. As an example, referring to row 406, a Kerberos ID field in a network packet may identify a specific user as a security entity that corresponds to that network packet. As another example, referring to row 408, ApplePushGUID field in a network packet may identify a specific device as a security entity that corresponds to that network packet. As yet another example, referring to row 410, Cookies in a network packet may identify a specific device as a security entity in addition to a specific browser as another security entity that corresponds to that network packet. In general, a decisive identifier particularly identifies a specific security entity, based on evaluation of a network packet and selectively extracting a portion of the network packet.

Now, referring to FIG. 4A, an example table 420, column 422 shows a plurality of attributes associated with one or more security entities. For example, referring to row 424, an attribute "OS" or operating system may be identified by evaluating a network packet and selectively extracting a portion of the network packet. As yet another example, referring to row 426, an attribute "OS version" or operating system version may be identified by evaluating a network packet and selectively extracting a portion of the network packet. As one skilled in the art appreciates, an attribute may not uniquely identify a security entity, but may indicate a characteristic of a security entity.

Now, referring to FIG. 4B, table 430 shows various decisive identifiers, corresponding protocol of the network packet and one or more fields of the network packet required to identify the corresponding decisive identifier. For example, column 432 shows decisive identifiers, column 434 shows protocol name and column 436 shows one or more required field in the network packet corresponding to the protocol. As an example, referring to row 438, a decisive identifier "userid" may be extracted from a network packet conforming to Hyper Text Transfer Protocol ("http") protocol, based on the field "uri" ("Uniform Resource Indicator") in the network packet. As an example, referring to row 440, a decisive identifier "ApplePushGUID" may be extracted from a network packet conforming to Secure Socket Layer (SSL) protocol, based on the field "client_subject" in the network packet. As previously described with reference to FIG. 4 and table 400, each of the decisive identifiers identify a corresponding security entity.

As one skilled in the art appreciates, it may be beneficial to associate one or more decisive identifiers to a corresponding network address of a network device. Now, referring to FIG. 5, table 500, an example table is shown with a decisive identifier associated with a network address, for example, source identifier, sometimes referred to as source ID. As one skilled in the art appreciates, entries for table 500 may be created based on extracting selective information from one or more network packets, as previously disclosed. Referring to table 500, column 502 shows a time stamp, column 504 shows source ID, column 506 shows client details and column 508 shows status of the communication.

Now, referring to row 510, at time 1428494181, source ID was 1.1.1.1, a device ID of ABC-111111 (with a source ID of 1.1.1.1) communicated with domain GEO.DOMAIN. COM and the communication was successful. Now, referring to row 512, at time 1428494240, source ID was 1.1.1.1, a user ID of john.doe communicated with domain GEO.DOMAIN.COM and the communication was successful. Now, referring to row 514, at time 1428494332, source ID was 1.1.1.1, a device ID of ABC-111111 (with a source ID of 1.1.1.1) communicated with domain GEO.DOMAIN.COM and the communication was successful. Now, referring to row 516, at time 1428497128, source ID was 1.1.1.1, a device ID of ABC-22222 (with a source ID of 1.1.1.1) communicated with domain GEO.DOMAIN.COM and the communication was successful. Now, referring to row 518, at time 1428497128, source ID was 1.1.1.1, a user ID of jane.smith communicated with domain GEO.DOMAIN. COM and the communication was successful.

In summary, we notice that a source ID of 1.1.1.1 was assigned to device ID of ABC-11111 during one time period and source ID of 1.1.1.1. was assigned to a device ID of ABC-22222 in a different time period. Also, we notice that user john.doe was using the device with a source ID of 1.1.1.1 in one time period and another user jane.doe was using the device with a source ID of 1.1.1.1 in a different time period. In one example, device ID of ABC-11111 may correspond to first user computer 104-1 and device ID of ABC-22222 may correspond to second user computer 104-2, as shown in FIG. 1. Further, john.doe may correspond to a first user and jane.doe may correspond to a second user.

In some examples, it may be beneficial to mark one or more identified security entities as belonging to a specific group. For example, a first group or a second group. In one example, based on the source ID, a security entity may be identified as belonging to a first group or a second group. In other words, based on an assigned network identifier, for example, IP address, a security entity may be assigned to one of the groups.

In one example, all IP addresses that are internal to an organization may be assigned to one of the groups, for example the first group. In some examples, IP addresses assigned to a known external organization may also be assigned to the first group. As another example, some well known domain names or organizations may have a range of IP addresses assigned to them. As yet another example, there may be an external organization with which the internal organization may have a relationship and the external organization may have a range of IP addresses assigned to them. So, if the IP address of a security entity falls within a range of IP address assigned to a known external organization, that security entity may also be assigned to the first group. In one example, the group a security entity belongs to may be advantageously stored in the knowledge graph, for possible use in a security investigation.

Figure 6C:
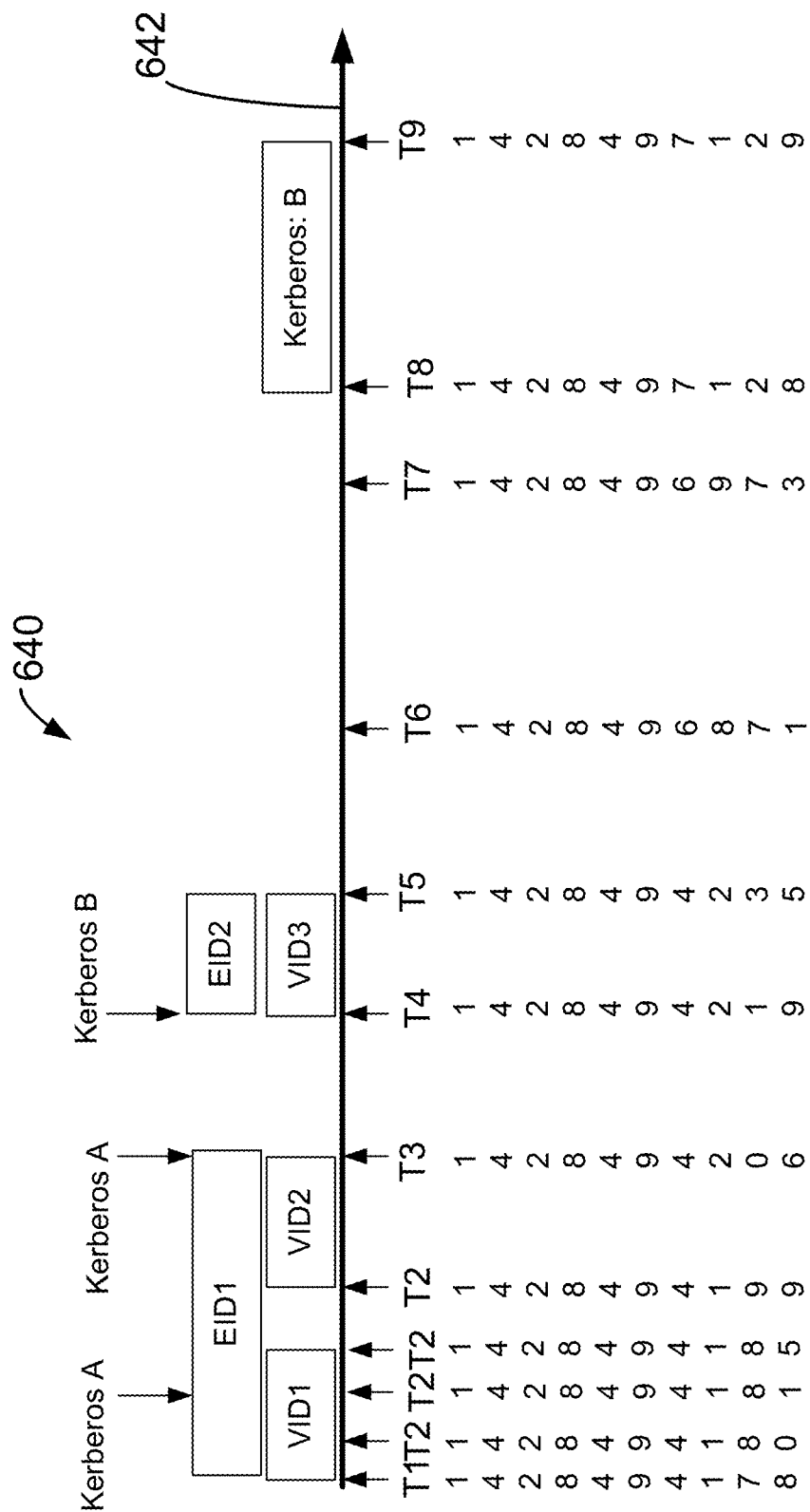
FIG. 6C shows a graph with various time stamps and corresponding decisive identifiers.

In some examples, it may be beneficial to extend association of a source ID to a security entity for more than one time period. Now, referring to FIG. 6, table 600, an example extension of association of a source ID to a security entity for more than one time period is disclosed. Referring to FIG. 6, table 600 is shown with various time stamp and corresponding decisive identifiers. Table 600 shows time stamp in column 602, source ID in column 604, decisive identifier in column 606 and comments in column 608. Referring to row 610, at time stamp of 142849481.223, the source ID was 1.1.1.1, decisive identifier was a Kerberos id of A. Now, in this example, the time stamp is shown in milliseconds and the time period is extended to one second. In other words, looking at the comment cell 612 of row 610, we notice that we associate the decisive identifier Kerberos:A to source ID 1.1.1.1 during the time interval 1428494181-1428494182. Now, referring to row 614, we notice that Personal Email id of M is associated with source ID of 1.1.1.1 during the time interval 14284262-14284263.

Now, referring to row 616, during time stamp of 14284261.781, decisive identifier Kerberos:A is again associated with source ID of 1.1.1.1. Now, referring to cell 618, we notice that we associate the decisive identifier Kerberos:A to source ID 1.1.1.1 during the time interval 1428494262-142849263. In addition, as there are no other kerberos identifiers other than A, we extend the association of kerberos:A to source ID 1.1.1.1 from the last time period when kerberos:A was identified to the current time period. In other words, the association is extended from time stamp 1428494182 to 1428494262.

Now, referring to row 620 and cell 622, we notice that decisive identifier personal email:M is associated with source ID of 1.1.1.1. Further, the association of personal email:M to source ID 1.1.1.1 is extended from the last period when personal email:M was identified to the current period, as no other personal email is associated with source ID 1.1.1.1 during this period.

Now, referring to row 626, we notice that there has been no activity between the time stamps 1428494798.223 to 1428496871.900 for source ID 1.1.1.1. Now, referring to row 628, we notice that decisive identifier Kerberos:A is associated with source ID 1.1.1.1. Referring to cell 630, we notice that the association of decisive identifier Kerberos:A is extended till the time period during which there was no activity. In other words, the association is extended from time stamp 1428494263 to 1428494799 (which in this example, refers to a sip session for source ID 1.1.1.1).

Now, referring to row 632, we notice that a new decisive identifier Kerberos:B was associated with source ID 1.1.1.1. Referring to cell 634, we notice that decisive identifier Kerberos:B is associated with source ID 1.1.1.1 for the time period 1428496871 to 1428496872. Referring to row 636, we notice that there was no activity between the time stamps 1428496972.223 to 1428497128.571 for source ID 1.1.1.1. Now, referring back to cell 634, we notice that the association of decisive identifier Kerberos:A is extended till the time period during which there was no activity for source ID 1.1.1.1. In other words, the association is extended from time stamp 1428496872 to 1428496973 (which in this example, refers to another sip session for source ID 1.1.1.1).

Now, referring to FIG. 6A, a pictorial graph 640 shows the association of decisive identifiers to a source ID of 1.1.1.1 over a period, as previously described with reference to FIGS. 6-1 and 6.2. Line 642 shows various time stamps T1-T9 over a period of time. During time period T1-T5, decisive identifier Kerberos:A was associated with source ID 1.1.1.1. During time period T2-T4, decisive identifier Personal Email: M was associated with source ID 1.1.1.1. During time period T5-T6 and T7-T8 there was no decisive identifier associated with source ID 1.1.1.1. During time period T6-T7, decisive identifier kerberos:A was associated with source ID 1.1.1.1. During time period T8-T9, decisive identifier kerberos:B was associated with source ID 1.1.1.1.

Now, based on FIGS. 6 and 6A, an example knowledge graph is constructed. Example knowledge graph is described with reference to FIGS. 7A and 7B. FIG. 7A shows table 700 showing various associations between a plurality of security entities, at various time stamps. FIG. 7B shows an updated knowledge graph table 730 showing various associations between a plurality of security entities, with extended time periods. Now, referring to table 700, column 702 shows time stamp, column 704 shows source ID, column 706 shows a first security entity, column 708 shows a second security entity, column 710 shows a first decisive identifier associated with at least one of the security entities and column 712 shows a second decisive identifier associated with at least one of the security entities. Various time stamps shown in table 700 correspond to the time stamp shown in FIG. 6A, which is a pictorial graph of information contained in FIG. 6. Further, association of one or more decisive identifiers as shown in table 500 of FIG. 5, further helps in developing the knowledge graph.

As an example, referring to row 714, at time stamp T1, source ID 1.1.1.1 is associated with first security entity first user computer and a second security entity first user, with a first decisive identifier Kerberos:A. For example, this corresponds to information stored in table 500 of FIG. 5. As another example, referring to row 716, at time stamp T2, source ID 1.1.1.1 is associated with first security entity first user computer and a second security entity first user, with a second decisive identifier personal email:M. Now, referring to row 718, at time stamp T5, there is no activity associated with source ID 1.1.1.1. Now, referring to row 720, at time stamp T8, source ID of 1.1.1.1 is associated with second user computer and second user (as shown in rows 516 and 518 of table 500 of FIG. 5 and further source ID of 1.1.1.1 is associated with decisive identifier kerberos:B, as described with reference to FIGS. 6 and 6A.

As previously described with reference to FIGS. 6 and 6A, the association between a security entity and a decisive identifier is extended to additional time periods, based on observed activity over the network. This extension of time period is shown and described in an updated knowledge graph table 730 shown in FIG. 7B. In one example, table 730 is similar to table 700 in construction. However, in time stamp column 702, a range of time period is shown, based on extension of time period, based on observed activity over the network. For example, based on activity observed (i.e. first decisive identifier of kerberos:A) at time stamp T1, T3 and T6, with an idle or no activity at time stamp T5, referring to row 732, the association between source ID of 1.1.1.1, first security entity and second security entity to decisive identifier kerberos:A is extended from T1-T5. Similarly, based on the observed activity at time stamp T2 and T4 (i.e. second decisive identifier of personal email:M), the association between source ID of 1.1.1.1, first security entity and second security entity to decisive identifier personal email:M is extended from T2-T4. As one skilled in the art appreciates, over time, the knowledge graph is enhanced with extended time periods showing association between a plurality of security entities and corresponding one or more decisive identifiers.

In some examples, it may be beneficial to associate each transaction to a corresponding security entity. However, not all transactions may be associated with a security entity that has been confirmed by a decisive identifier. In some examples, it may be beneficial to be able to selectively retrieve specific transactions based on one or more selective attributes and which are further associated with one or more selective security entities. In some examples, a virtual identifier may be assigned to a source ID for a subset of transactions within a predefined time period. Thereafter, when the source ID is associated with a decisive identifier, one or more of the virtual identifiers are also associated with a corresponding security entity identifier. Example implementation will now be described.

Referring to FIG. 8A, an example table 800 is described. Table 800 is similar to table 600, previously described with reference to FIGS. 6A and 6B in that the table shows time stamps with corresponding decisive identifiers. However, in this example, for various transactions or communications occurring within a predefined time period, a virtual identifier is assigned to the Source ID.

Table 800 shows time stamp in column 802, source ID in column 804, decisive identifier in column 806, virtual identifier in column 808 and comments in column 810. Referring to row 812, at time stamp of 1428494178.112, the source ID was 1.1.1.1, there was no decisive identifier, virtual identifier was VID1. Now, in this example, the time stamp is shown in milliseconds and the time period is extended to one second. In other words, looking at the comment cell 814 of row 812, we notice that we associate the virtual identifier VID1 to source ID 1.1.1.1 during the time interval 1428494178-1428494179. Further, we notice that this transaction was a http session. In other words, the protocol was "http".

Now, referring to row 816, at time stamp of 1428494180.211, the source ID was 1.1.1.1, there was no decisive identifier, virtual identifier is still VID1. Now, in this example, the virtual identifier is maintained to be the same, for a predefined period and in this example, the predefined period is 10 seconds. As one skilled in the art appreciates, the predefined period for which same virtual identifier is maintained may be different in different examples. Further, the time period is extended from the previous time interval, as the source ID and the virtual identifier were the same. In other words, looking at the comment cell 818 of row 814, we notice that we associate the virtual identifier VID1 to source ID 1.1.1.1 during the time interval 1428494178-1428494181. Also, we notice that this transaction was a ftp session. In other words, the protocol was "ftp".

Now, referring to row 820, at time stamp of 1428494181.223, the source ID was 1.1.1.1, there is a decisive identifier with a Kerberos id of A, virtual identifier is still VID1, as this transaction occurred within the predefined period of 10 seconds. Further, the time period is extended from the previous time interval, as the source ID and the virtual identifier were the same. In other words, looking at the comment cell 822 of row 820, we notice that we associate the virtual identifier VID1 to source ID 1.1.1.1 during the time interval 1428494178-1428494182. Further, as we did identify a decisive identifier in this transaction, we associate the virtual identifier VID1 to an entity identifier EID1. Now, the source ID of 1.1.1.1 is associated with virtual identifier VID1 which is associated with entity identifier EID1. Also, we notice that the protocol for this transaction is identified as Kerberos.

Now, referring to row 824, at time stamp of 1428494184.889, the source ID was 1.1.1.1, no decisive identifier and virtual identifier is still VID1, as this transaction occurred within the predefined period of 10 seconds. Further, the time period is extended from the previous time interval, as the source ID and the virtual identifier were the same. In other words, looking at the comment cell 826 of row 824, we notice that we associate the virtual identifier VID1 to source ID 1.1.1.1 during the time interval 1428494178-1428494185. Also, we notice that the protocol for this transaction is identified as a sip session.

Now, referring to row 828, at time stamp of 1428494199.226, the source ID was 1.1.1.1, there is a decisive identifier with a personal email of M, virtual identifier is now VID2, as this transaction occurred in a subsequent predefined period of 10 seconds. Looking at the comment cell 830 of row 828, we notice that we associate the virtual identifier VID2 to source ID 1.1.1.1 during the time interval 1428494199-1428494200. Further, we associate the virtual identifier VID2 to personal Email M. Also, we notice that the protocol for this transaction is identified as http, as the Email session was based on an http protocol.

Now, referring to row 832, at time stamp of 1428494205.781, the source ID was 1.1.1.1, there is a decisive identifier with a Kerberos id of A, virtual identifier is still VID2, as this transaction occurred within the predefined period of 10 seconds. Further, the time period is extended from the previous time interval, as the source ID and the virtual identifier were the same. In other words, looking at the comment cell 834 of row 832, we notice that we associate the virtual identifier VID2 to source ID 1.1.1.1 during the time interval 1428494199-1428494206. Further, as we did identify a decisive identifier in this transaction, and the decisive identifier is the same as previously identified with virtual identifier VID1, we associate the virtual identifier VID2 to virtual identifier VID1, which was previously associated with entity identifier EID1. Now, the source ID of 1.1.1.1 is associated with virtual identifier VID1 and VID2 which is associated with entity identifier ED 1. Also, we notice that the protocol for this transaction is identified as Kerberos.

Now, referring to row 836, at time stamp of 1428494219.781, the source ID was 1.1.1.2, there is a decisive identifier with a Kerberos id of B, virtual identifier is now VID3, as this transaction occurred after the predefined period of 10 seconds. Now, looking at the comment cell 838 of row 836, we notice that we associate the virtual identifier VID3 to source ID 1.1.1.2 during the time interval 1428494219-1428494220. Further, as we did identify a decisive identifier in this transaction, and the decisive identifier is different than previously identified decisive identifier with virtual identifier VID1 and VID2, we associate the virtual identifier VID3 to a new entity identifier EID2. Now, the source ID of 1.1.1.2 is associated with virtual identifier VID3 which is associated with entity identifier EID3. Also, we notice that the protocol for this transaction is identified as Kerberos.

Finally, referring to row 840, at time stamp of 1428494224.781, the source ID was 1.1.1.2, there is no decisive identifier, virtual identifier is still VID3, as this transaction occurred within the predefined period of 10 seconds. Now, looking at the comment cell 842 of row 840, we notice that we extend the association of the virtual identifier VID3 to source ID 1.1.1.2 during the time interval 1428494219-1428494224. Also, we notice that the protocol for this transaction is identified as a http session.

Figure 8B:
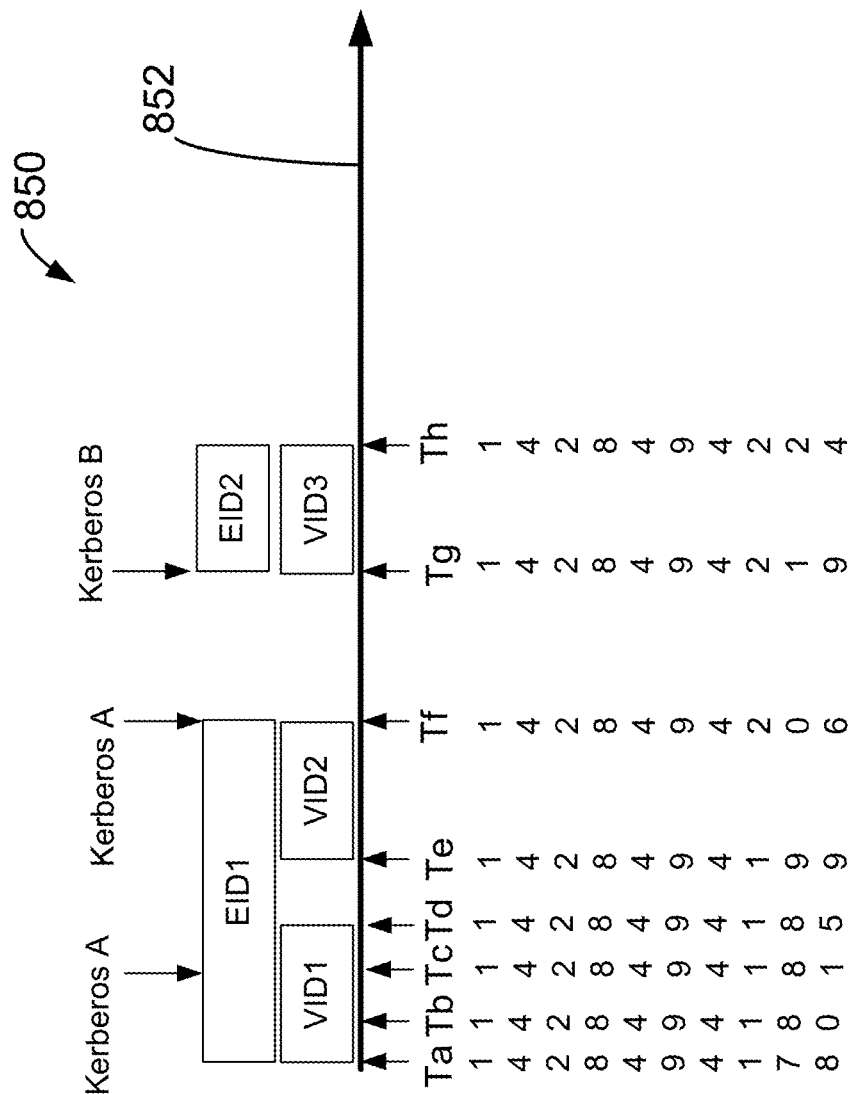
FIG. 8B shows a graph with various time stamps and corresponding virtual identifiers.

Now, referring to FIG. 8B, a pictorial graph 850 shows the association of virtual identifiers to a corresponding entity identifier based on identified decisive identifier for source ID 1.1.1.1 and 1.1.1.2 over a period, as previously described with reference to FIG. 8A. Line 852 shows various time stamps Ta–Th over a period of time. During time period Ta-Td, virtual identifier VID1 was associated with source ID 1.1.1.1. At time period Tc, a decisive identifier Kerberos:A was associated with virtual identifier VID1, which was associated with source ID 1.1.1.1. An entity identifier EID1 was assigned at time Tc to virtual identifier VID1 and extended from time period Ta–Tc. As virtual identifier VID1 extended to time period Td, the association of entity identifier EID1 was further extended to time period Td. Later, virtual identifier VID2 was assigned for the time period Te to Tf. At time period, Tf, a decisive identifier Kerberos:A was associated with virtual identifier VID2, which was associated with source ID 1.1.1.1. Based on this association of decisive identifier to source ID 1.1.1.1, the entity identifier EID1 is now associated with both VID1 and VID2, for a time period Ta-Tf. In other words, the association of entity identifier EID1 was extended for the time period Ta-Tf.

Now, referring to time period Tg to Th, we notice that virtual identifier VID3 was assigned at time Tg and decisive identifier Kerberos:B was associated with virtual identifier VID3, which was further associated with entity identifier EID2. Further, the virtual identifier VID3 was extended to time Th. And, entity identifier EID2 was extended to time Th. As one skilled in the art appreciates, based on a decisive identifier, one or more virtual identifiers are associated with a corresponding entity identifier.

Now, referring to FIG. 9, an example table 900 is described. Table 900 shows an example activity table for various transactions or activity that occurred, as previously described with reference to table 800. Referring to table 900, column 902 shows activity ID, column 904 shows time stamp, column 906 shows source ID, column 908 shows virtual identifier. A plurality of columns show various attributes associated with each of the activity ID. For example, column 910 showing attribute Kerberos, column 912 showing attribute and column 914 showing attribute protocol. Each of the rows of the table 900 show various details for the corresponding activity. For example, referring to row 916, we notice that for activity ID AID1, corresponding time stamp is 1428484178.112, with a source ID of 1.1.1.1, virtual identifier of VID1 and protocol "http".

As one skilled in the art appreciates, activity ID AID1 corresponds to activity or transaction shown in row 812 of table 800 of FIG. 8A. In other words, the activity record table 900 is summarizing various selective information of a communication that occurred at a given time stamp. In one example, the activity record table 900 may be selectively queried to selectively retrieve details of one or more communication that match one or more attributes. As an example, by querying activity record table 900 for all activities that matches a given protocol, for example, "http" protocol would return matching results with activity ID AID1, AID4, AID6 and AID9.

Now, referring to FIG. 10, an example virtual identification table 1000 is described. Table 1000 shows association between a source ID, virtual ID and a corresponding entity identifier, for the broadest time stamp interval observed by the security appliance. Now referring to table 1000, column 1002 shows time stamp interval, column 1004 shows source ID, column 1006 shows virtual identifier and column 1008 shows entity ID. Information in various cells of table 1000 is based on the transaction details previously described with reference to table 800.

Now, referring to row 1010, we notice that for time stamp interval 14294941778-1428494185, source ID was 1.1.1.1, virtual identifier was VID1 and entity ID was EID1. Similarly, referring to row 1012, source ID was 1.1.1.1, virtual identifier was VID2 and entity ID was EID1. And, referring to row 1014, source ID was 1.1.1.2, virtual identifier was VID3 and entity ID was EID2.

Now, referring to FIG. 11, an example entity-attribute table 1100 is shown. The entity-attribute table 1100 shows attributes associated with each of the identified entity. For example, column 1102 shows entity ID, column 1104 shows attribute Kerberos, column 1106 shows attribute personal Email. Now, referring to row 1108, we see that for entity ID of EID1, associated attribute values are A for Kerberos, M for personal Email. Similarly, referring to row 1110, for entity ID of EID2, associated attribute value is B for Kerberos. There is no value associated with personal Email for entity ID EID2.

In some examples, it may be desirable to selectively retrieve association between a selected security entity and one or more attributes of communication transactions in which the selected entity was involved. For example, let us say we want to selectively retrieve all transactions of a security entity with an entity ID of EID1 and an attribute of protocol, say http protocol. An example implementation of such an association is now described with reference to a FIG. 12 and an example flow diagram 1200.

Figure 12:
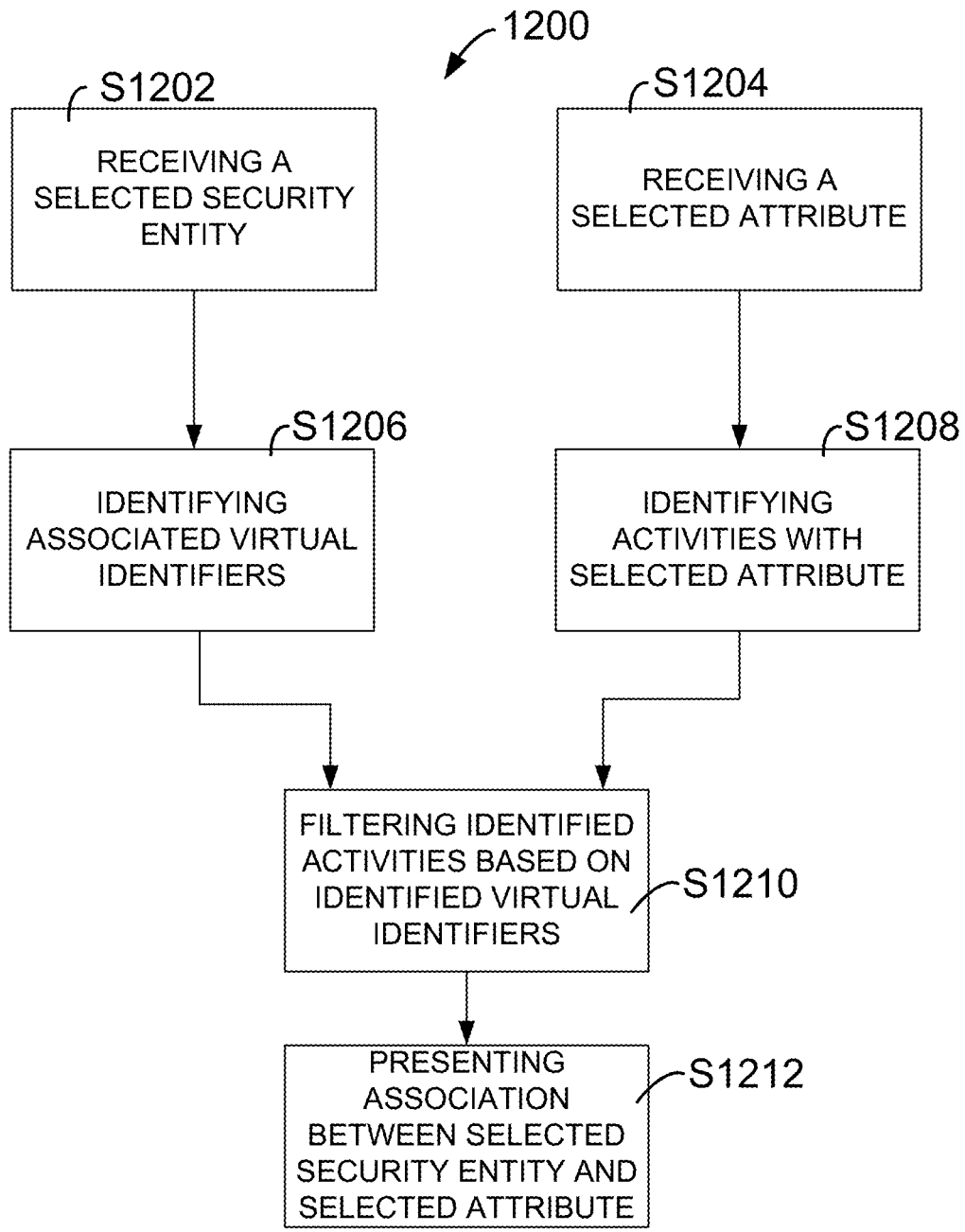
FIG. 12 shows an example flow diagram to associate a selected security entity with a corresponding selected attribute.

Now, referring to FIG. 12, in block S1202, information related to a selected security entity is received. In one example, a user interface implemented in a web browser (not shown) may use an interface from the application programming interface 228 module of the security appliance 102 of FIG. 2 to obtain information related to a selected security entity. For example, the selected security entity may be an entity with an entity ID of ED 1. In block S1204, information related to a selected attribute is received. In one example, a user interface implemented in a web browser (not shown) may use an interface from the application programming interface 228 module of the security appliance 102 of FIG. 2 to obtain information related to a selected attribute. For example, the selected attribute may be "http" protocol.

In block S1206, virtual identifiers associated with the selected security entity is identified. For example, referring to virtual identifier table 1000 of FIG. 10, we notice that entity ID of EID1 is associated with virtual identifiers VID1 and VID2. The security appliance 102 may be configured to selectively query one or more of the data stores to retrieve the virtual identifiers associated with the selected security entity.

In block S1208, specific activities with selected attribute is identified. For example, referring back to activity report table 900, we notice that activities AID1, AID4, AID6 and AID9 had http protocol. The security appliance 102 may be configured to selectively query one or more of the data stores to retrieve the activities associated with the selected attribute.

In block S1210, identified activities are filtered based on identified virtual identifiers. Referring back to the activity report table 900, we notice that activities AID1, AID4 and AID6 correspond to the virtual identifiers VID1 and VID2. However activity AID9 does not correspond to either virtual identifier VID1 or VID2. So, activity AID9 is dropped or filtered out of the activity list that corresponds to security entity with an entity ID of EID1. The security appliance 102 may be configured to selectively perform the filtering activity. In one example, the analytics engine 212 of the security appliance 102 may be configured to perform the filtering activity.

In block S1212, association between selected security entity and selected attribute is presented. In one example, the application programming interface 228 module of the security appliance 102 may be configured to present an association table to a user on a user display device, for example, a web browser displayed on a user computer. FIG. 13 shows an example association table 1300 that may be presented to show the association between selected security entity and selected attribute.

Now, referring to FIG. 13, an example association table 1300 is shown. In table 1300, column 1302 shows entity ID, column 1304 shows time stamp, column 1306 shows Source ID, columns 1308-1312 show various attributes. Specifically, column 1312 shows attribute protocol. In this example, row 1314 shows various values associated between security entity with an entity identifier of EID1 and corresponding details from activity with an activity ID of AID1, as shown in table 900. Similarly, row 1316 shows various values associated between security entity with an entity identifier of EID1 and corresponding details from activity with an activity ID of AID4, as shown in table 900. Finally, row 1318 shows various values associated between security entity with an entity identifier of EID1 and corresponding details from activity with an activity ID of AID6, as shown in table 900.

As one skilled in the art appreciates, security entities may be data, network, organization, device, persona (or user attributes) and application. In one example, the security entities are entities that may have attributes that may be directly or indirectly relevant from a security or threat analysis perspective. The security appliance 102 selectively extracts information from communication between two computing devices and builds one or more tables and matrices of useful information, for example, various tables and matrix described in this disclosure.

Figure 14:
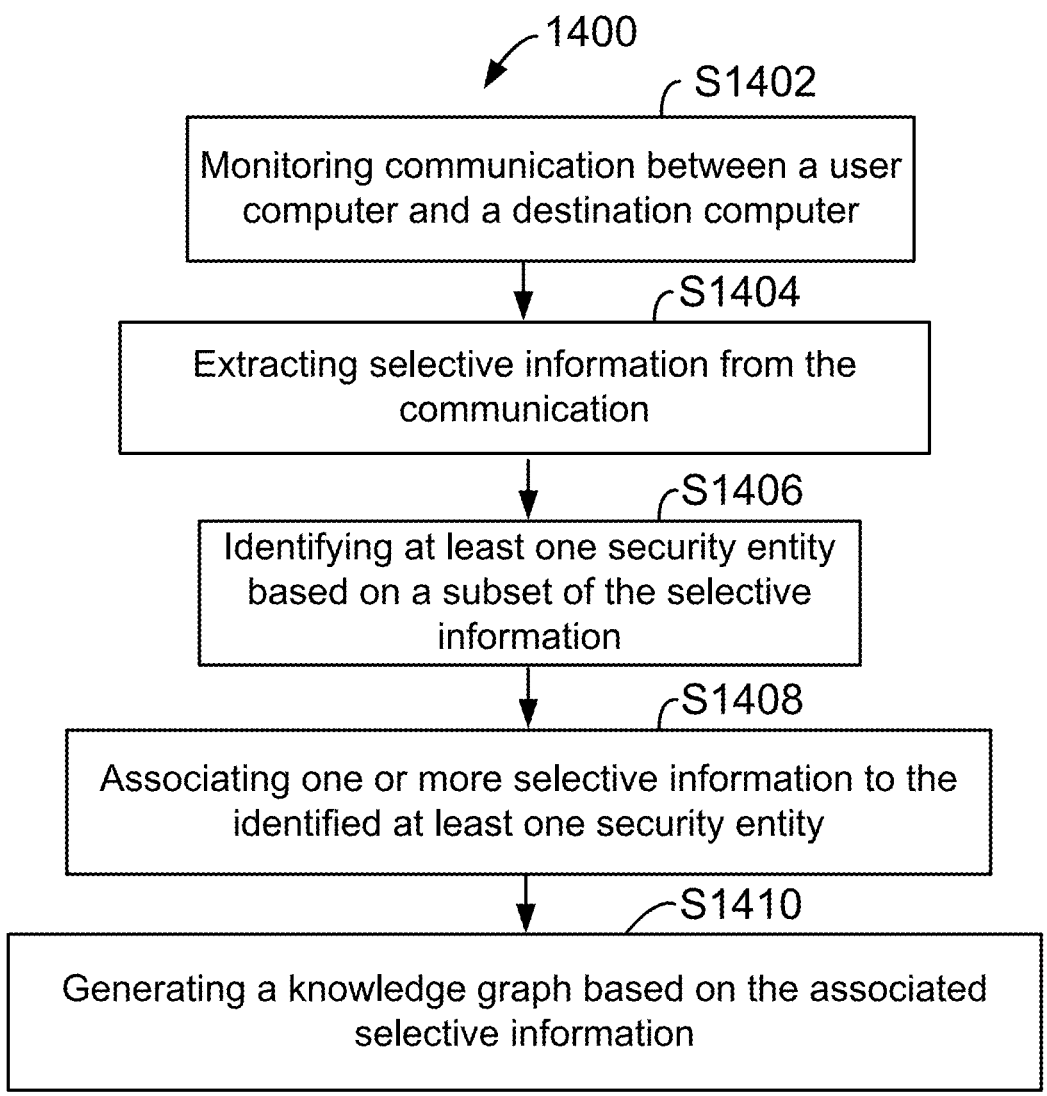
FIG. 14 shows an example flow diagram to identify a security entities in a computing environment, according to an example implementation of this disclosure.

Now, referring to FIG. 14 an example flow diagram 1400 is described. In block S1402, communication between a user computer and a destination computer is monitored. In some examples, the user computer may be one or more of the user computers, for example, first user computer 104-1, second user computer 104-2 and third user computer 104-3 as shown and described with reference to FIG. 1. In some examples, the destination computing device may be one or more the servers, for example, first server 116, second server 118, third server 120 and the fourth server 112 as shown and described with reference to FIG. 1.

In block S1404, selective information from the communication is extracted. For example, as described with reference to security appliance 102 of FIG. 2 selective information from the packets are extracted.

In block S1406, at least one security entity is identified based on a subset of the selective information. For example, as described with reference to FIG. 5, one or more security entities may be identified based on a subset of selective information. In some examples, the analytics engine 212 of the security appliance 102 may be configured to identify one or more security entities based on a subset of the selective information.

In block S1408, one or more selective information may be associated to at least one security entity. For example, as described with reference to FIGS. 6 and 6A, one or more selective information may be associated to at least one security entity. In some examples, the analytics engine 212 of the security appliance 102 may be configured to associate one or more selective information to at least one security entity.

In block S1410, a knowledge graph is generated based on the associated selective information. For example, as described with reference to FIGS. 7A and 7B, a knowledge graph may be generated based on the associated selective information.

The embodiments disclosed herein can be implemented through at least one software program running on at least one hardware device and performing various functions of the security appliance. Various functions of the security appliance as described herein can be at least one of a hardware device, or a combination of hardware device and software module.

The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means, and at least one software means. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for identifying a security entity in a computing environment, comprising:
    monitoring a communication between a user computer and at least one destination computer by a security appliance;
    extracting selective information from the communication by the security appliance;
    assigning a first virtual identifier to a subset of the communication within a first time interval;
    extending the first time interval so that the subset of the communication to which the first virtual identifier is assigned applies to a larger portion of the communication;
    identifying at least one security entity based on a subset of the extracted selective information within a duration of the extended first time interval;
    associating one or more of the extracted selective information from the communication within the duration of the extended first time interval to the identified at least one security entity; and
    associating the assigned first virtual identifier to the identified at least one security entity, for the duration of the extended first time interval.

2. The method of claim 1, further including, confirming an identity of the identified at least one security entity within duration of the extended first time interval, based on an association between a decisive identifier present in the extracted selective information during the extended first time interval and the identified at least one security entity during the extended first time interval; and
    associating a first entity identifier to the identified at least one security entity, for the duration of the extended first time interval.

3. The method of claim 2, further including evaluating another subset of selective information belonging to a second time interval;
    assigning a second virtual identifier for the second time interval;
    associating the second virtual identifier with the identified at least one security entity; and
    confirming the identity of the identified at least one security entity for the second time interval, based on an association between another decisive identifier present in the extracted selective information during the second time interval and the identified at least one security entity; and
    associating the first entity identifier to the identified at least one security entity, for the second time interval, when the another decisive identifier present in the second time interval is same as the decisive identifier present in the extended first time interval.

4. The method of claim 3, wherein the extended first time interval and the second time interval are contiguous.

5. The method of claim 3, wherein the extended first time interval and the second time interval are separated by one or more additional time intervals.

6. The method of claim 3, further including associating a second entity identifier to the identified at least one security entity, for the second time interval, when the another decisive identifier present in the second time interval is different than the decisive identifier present in the extended first time interval.

7. The method of claim 6, further including:
associating an activity identifier for one or more activities occurring within each time intervals for each of the virtual identifiers;
receiving a request to identify attribute associated with a security entity based on its entity identifier;
identifying one or more virtual identifiers associated with the requested entity identifier of the security entity; and
presenting attribute associated with the requested entity identifier, based on the association between the identified one or more virtual identifiers and the activity identifier.

8. The method of claim 1, further including, confirming an identity of the identified at least one security entity for the first interval, based on an association between a decisive identifier present in the extracted selective information during the extended first time interval and the identified at least one security entity.

9. The method of claim 1, wherein the security entity is associated with a network address.

10. The method of claim 2, further including:
associating an activity identifier for one or more activities occurring within each time intervals for the first virtual identifier;
receiving a request to identify attribute associated with the identified at least one security entity, based on the first entity identifier;
identifying the virtual identifier associated with the first entity identifier of the identified at least one security entity; and
presenting attribute associated with the identified at least one security entity based on the association between the identified virtual identifier and the activity identifier.

11. A system to identify a security entity in a computing environment, comprising:
a security appliance configured to
monitor a communication between a user computer and a destination computer;
extract selective information from the communication;
assign a first virtual identifier to a subset of the communication within a first time interval;
extend the first time interval so that the subset of the communication to which the first virtual identifier is assigned applies to a larger portion of the communication;
identify at least one security entity based on a subset of the extracted selective information within a duration of the extended first time interval;
associated one or more of the extracted selective information from the communication within the duration of the extended first time interval to the identified at least one security entity; and
associate the assigned first virtual identifier to the identified at least one security entity, for the duration of the extended first time interval.

12. The system of claim 11, further including, confirming an identity of the identified at least one security entity within the duration of the extended first time interval, based on an association between a decisive identifier present in the extracted selective information during the extended first time interval and the identified at least one security entity during the extended first time interval; and associating a first entity identifier to the identified at least one security entity, for the duration of the extended first time interval.

13. The system of claim 12, wherein another subset of selective information belongs to a second time interval is evaluated;
a second virtual identifier is assigned for the second time interval;
the second virtual identifier is associated with the identified at least one security entity; and
the identity of the identified at least one security entity for the second time interval is confirmed based on an association between another decisive identifier present in the extracted selective information during the second time interval and the identified at least one security entity; and
the first entity identifier is associated with the identified at least one security entity, for the second time interval, when the another decisive identifier present in the second time interval is same as the decisive identifier present in the extended first time interval.

14. The system of claim 13, wherein the extended first time interval and the second time interval are contiguous.

15. The system of claim 13, wherein the extended first time interval and the second time interval are separated by one or more additional time intervals.

16. The system of claim 13, wherein, a second entity identifier is associated with the identified at least one security entity, for the second time interval, when the another decisive identifier present in the second time period is different than the decisive identifier present in the extended first time interval.

17. The system of claim 16, wherein an activity identifier is associated with one or more activities occurring within each time intervals for each of the virtual identifiers;
a request to identify attribute associated with a security entity based on its entity identifier is received;
one or more virtual identifiers associated with the requested entity identifier of the security entity is identified; and
attribute associated with the requested entity identifier is presented based on the association between the identified one or more virtual identifiers and the activity identifier.

18. The system of claim 11, wherein an identity of the identified at least one security entity for the first interval is confirmed based on an association between a decisive identifier present in the extracted selective information during the extended first time interval and the identified at least one security entity.

19. The system of claim 11, wherein the security entity is associated with a network address.

20. The system of claim 12 further including:
an activity identifier for one or more activities occurring within each time intervals is associated with the first virtual identifier;
a request to identify attribute associated with the identified at least one security entity is received, based on the first entity identifier;
the virtual identifier associated with the first entity identifier of the identified at least one security entity is identified; and
attribute associated with the identified at least one security entity is presented based on the association between the identified virtual identifier and the activity identifier.

21. The method of claim 2, wherein, no other decisive identifier is identified during the duration of the extended first time interval.

22. The system of claim 12, wherein, no other decisive identifier is identified during the duration of the extended first time interval.

* * * * *